(12) United States Patent
Holley

(10) Patent No.: US 6,190,248 B1
(45) Date of Patent: Feb. 20, 2001

(54) OYSTER SHUCKER METHOD AND APPARATUS

(76) Inventor: James D. Holley, 104 Azalea Dr., Abbeville, LA (US) 70510

(*) Notice: Under 35 U.S.C. 154(b), the term of this patent shall be extended for 0 days.

(21) Appl. No.: 09/505,478

(22) Filed: Feb. 16, 2000

(51) Int. Cl.$^7$ ................................................. A22C 29/13
(52) U.S. Cl. ............................................ 452/13; 452/16
(58) Field of Search ................................. 452/13, 12, 16

(56) References Cited

U.S. PATENT DOCUMENTS

| | | |
|---|---|---|
| D. 282,076 | 1/1986 | Taylor . |
| 880,222 * | 2/1908 | Klinge .................................... 452/16 |
| 896,162 * | 8/1908 | Roters .................................... 452/16 |
| 3,886,628 | 6/1975 | Berry . |
| 4,255,835 | 3/1981 | Demulder . |
| 4,551,886 | 11/1985 | Couche et al. . |
| 4,663,805 | 5/1987 | Adcock . |
| 4,796,333 * | 1/1989 | Stinson, Jr. et al. ................. 452/16 |
| 4,870,719 | 10/1989 | Harris . |
| 4,905,350 | 3/1990 | Gardner . |
| 5,145,448 | 9/1992 | Dbisuzaki . |
| 5,178,577 * | 1/1993 | Kirk ...................................... 452/13 |
| 5,288,263 | 2/1994 | Ayala . |
| 5,334,080 * | 8/1994 | Webb .................................... 452/13 |
| 5,427,567 * | 6/1995 | Adock ................................... 452/13 |

* cited by examiner

Primary Examiner—Willis Little
(74) Attorney, Agent, or Firm—Robert N. Montgomery

(57) ABSTRACT

A method and apparatus for opening oysters or clams along the seam naturally occurring between the hinged portions of the oyster or clam shell. The apparatus is composed of a heavy base portion having a vertical column attached thereto, the column having mounted perpendicularly thereto a spreader operated by hand or a biased pivotal foot pedal, the spreader having opposable jaws which, upon depressing the handle by hand or with the foot pedal, are spread apart. A movable anvil is provided with a pivotal lever arm for positioning the oyster or clam relative to the opposable jaws of the spreader.

10 Claims, 4 Drawing Sheets

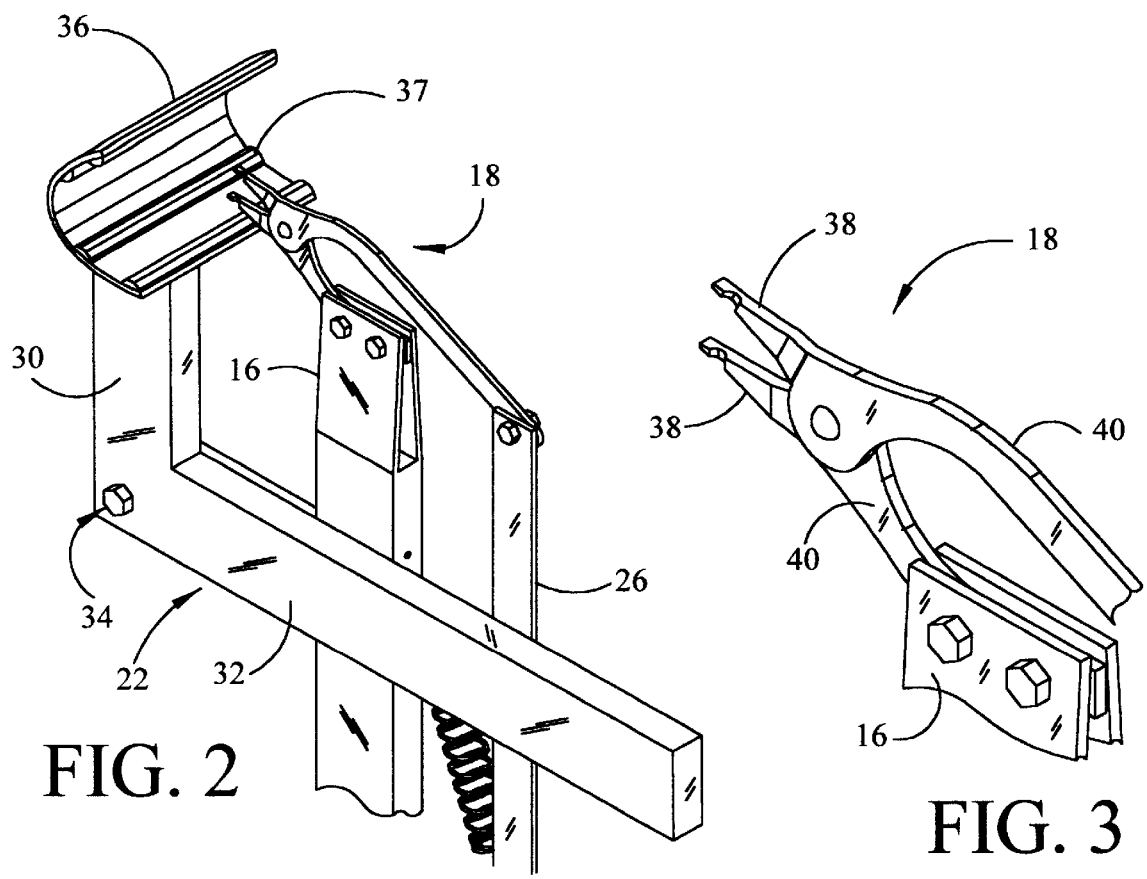
FIG. 2
FIG. 3
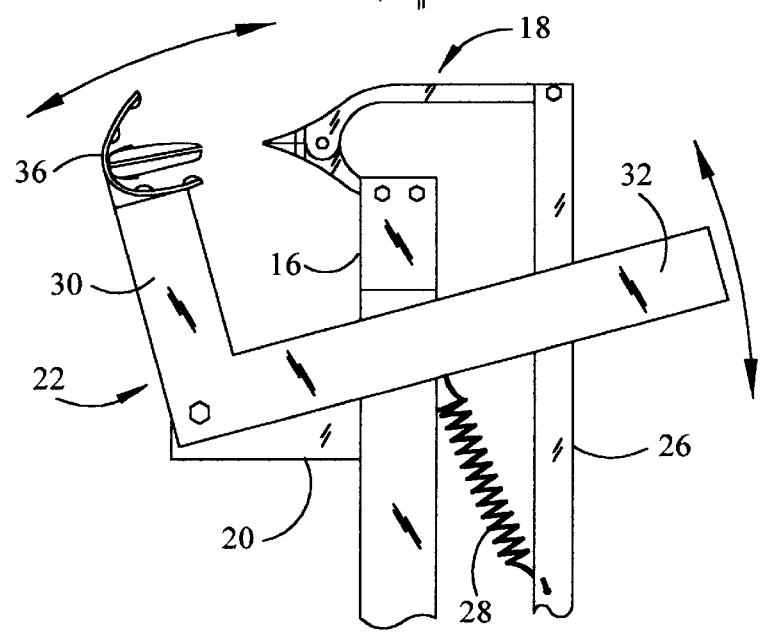
FIG. 4

OYSTER SHUCKER METHOD AND APPARATUS

BACKGROUND OF THE INVENTION

1. Field of the Invention

This invention relates generally to the process of opening mollusk shells and more particularly to the opening of oyster shells so as to obtain access to the oyster inside.

2. General Background

It is fully recognized that the hinged shell surrounding the oyster or clam is an effective protection mechanism and is very difficult to open due to the strong muscle tissue which holds the two halves of the shell together. Never the less, humans and animals alike have been dining on these crustaceans for centuries using only simple tools. However, man has continuously sought to improve his efficiency for removal of the oyster shell.

Oyster shucking, the process of opening and removing oysters from their shell, can be divided into three distinct groups: Manually opening, by prying the shell apart with a shape tool, various semi-manual apparatus for holding, notching and spreading the shells apart and includes methods for cutting the adductor muscle, and, finally, the fully automatic apparatus for cutting the shell, separating and removing the oyster on a production basis.

The semi-manual apparatus well known within the art demonstrates that the oyster or clam shell can be positioned against a movable or stationary anvil and a fixed or movable wedge shaped instrument forcibly inserted in the seam between the two halves, thereby prying the shells apart. However, such apparatus require a good deal of force to separate the shells sufficiently to break the hinge and tear the adductor muscle. Therefore, a pivotal lever is generally employed. In other apparatus the shells are simply separated a minimal distance to allow for cutting the adductor muscle, thus allowing the oyster or clam to be removed from the shell by hand. The method for separating the shell may utilize a motorized combination of a wedge and rotatable blade to pry the shell apart while being held in position by hand, a hazardous operation at best.

With the exception of the fully automatic, production operations, which are generally cumbersome, expensive and generally require further handling, the various shucking apparatus require that the oyster be positioned in or on an anvil member and a wedge of some sort be placed in contact with the natural seam opening in the oyster shell. A force is applied manually or by pivotal leverage and or rotation of the wedge within the seam, thus forcing the shells apart. Since no two oysters are the same size or exact configuration, such procedures require a good deal of manual exertion and dexterity to become efficient. It is therefore desirable to remove the oyster from the shell as efficiently and as safely as possible. However, most such manual extraction apparatus have proven to be either ineffective, hard to use, or hazardous to personnel. Accordingly, a more efficient, less demanding apparatus for this purpose is highly desirable.

SUMMARY OF THE INVENTION

The present invention provides an improved apparatus for opening oysters or clams along the seam naturally occurring between the hinged portions of the oyster or clam shell. The present apparatus is composed of a heavy base portion having a vertical column extending upwards to approximately counter top height and having mounted to the top thereof a set of spreadable jaws, the opposable jaws which, upon closing by pivoting the handle thereof, are spread apart. A movable anvil is provided with a pivotal lever arm for positioning the oyster or clam relative to the opposable jaws of the spreader. Additional leverage for operating the spreader is provided with a biased pivotal foot pedal.

In operation the oyster is positioned horizontally in the anvil and brought into contact with the opposable jaws of the spreader by manipulation of the pivotal anvil arm. Pressure is then exerted upon the anvil arm, thereby forcing the jaws of the spreader, or jaw expander, between the oyster shell halves. The foot pedal or manual spreader handle is then operated while maintaining pressure on the anvil arm, thereby spreading the opposable jaws of the spreader and thus forcing the oyster shell halves apart with minimal effort and less damage to the shell and oyster. Having the oyster positioned in the horizontal position helps insure that the vital liquids surrounding the oyster are maintained for serving of the oyster on the half shell after opening.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 2 is a partial isometric close-up view of the 1st embodiment illustrated in FIG. 1

FIG. 3 is a partial isometric close-up view of the spreader illustrated in FIG. 2;

FIG. 4 is a partial side elevation view of the $1^{st}$ embodiment in operation showing $1^{st}$ position movements;

DETAILED DESCRIPTION OF THE PREFERRED EMBODIMENT

Figure 1:
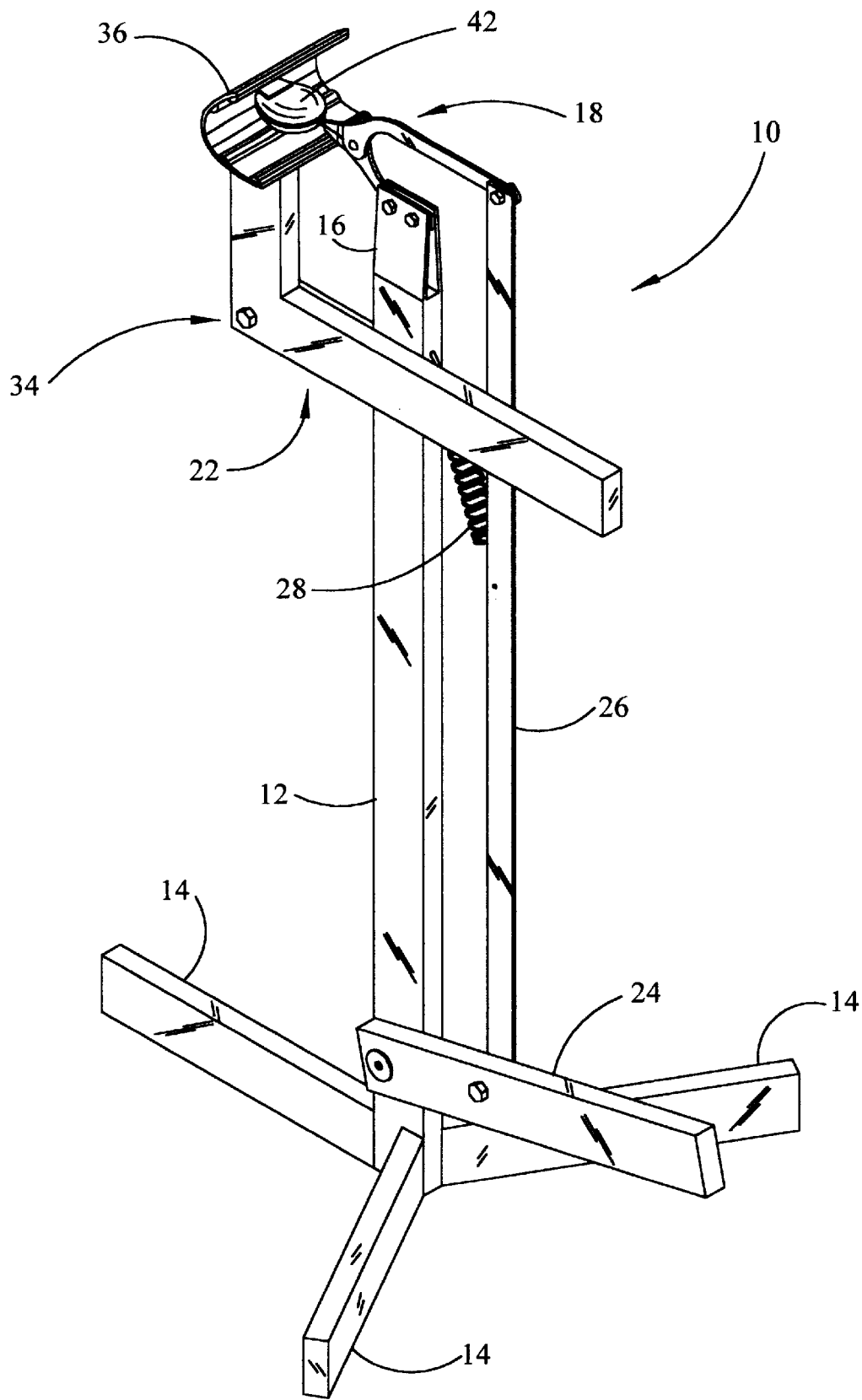
FIG. 1 is an isometric view of a 1st embodiment of the invention.

FIG. 1 illustrates the general configuration of a $1^{st}$ embodiment of the disclosed apparatus 10 for shucking oysters, clams and the like. The apparatus 10 includes a vertical column 12 extending upwards to a working height of approximately counter top level, rigidly supported by members 14 extending outwardly therefrom forming a stabilizing base. Alternatively, a weighted round circular base may be used as a means for stabilizing the vertical column. A bracket member 16 located at the upper end of the column 12 supports the removable spreader assembly 18 The vertical column further includes a pivotal support member 20, best seen in FIG. 4, located adjacent the spreader and bracket members 16,18 and extending horizontally from the vertical column 12. An anvil assembly 22 is pivotally attached to the support member 20 by a pin assembly 34. The anvil assembly 22, best seen in FIG. 2, includes an "L" shaped arm having vertical and horizontal members 30, 32, the arm being pivotal about pin assembly 34 located adjacent the intersection of the vertical and horizontal arms 30, 32, the arm 32 being used as a hand lever. The anvil assembly further includes an elongated "U" shaped member 36 having raised ridges 37 therein. The "U" shaped member 36 is positioned transversely of the vertical member 30 and serves as the anvil against which the oyster is to be placed.

As illustrated in FIG. 3, the spreader apparatus 18 is a set of pliers having opposable jaws 38 which spread apart upon closing of the handles 40. Therefore, by clamping or otherwise retaining a portion of one of the handles 40 in the spreader bracket 16 horizontally in the manner shown relative to the anvil 36 as seen in FIG. 2, the spreader serves as an effective wedge as well. The lower handle portion 40 of the pliers 18 is secured in the bracket 16 and is shortened to allow for greater spread of the opposable jaws 38. The upper handle 40 is attached to a pivotal foot pedal lever 24 by pivotal link 26. The spreader's opposable jaws 38 are maintained in the closed position by a spring 28 connected between the link 26 and the column 12.

Figure 5:
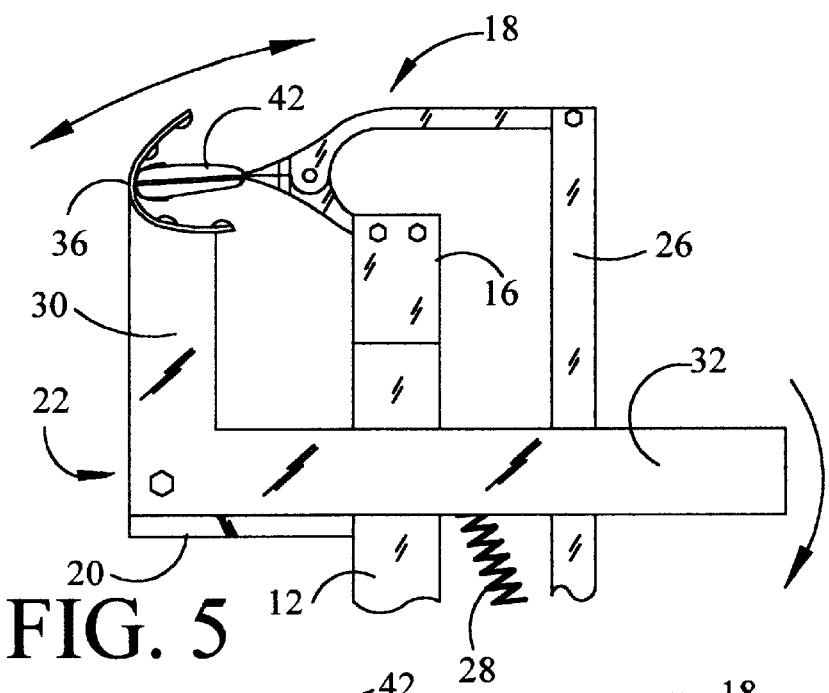
FIG. 5 is a partial side elevation view of the $1^{st}$ embodiment in operation showing 2nd position movements.
Figure 6:
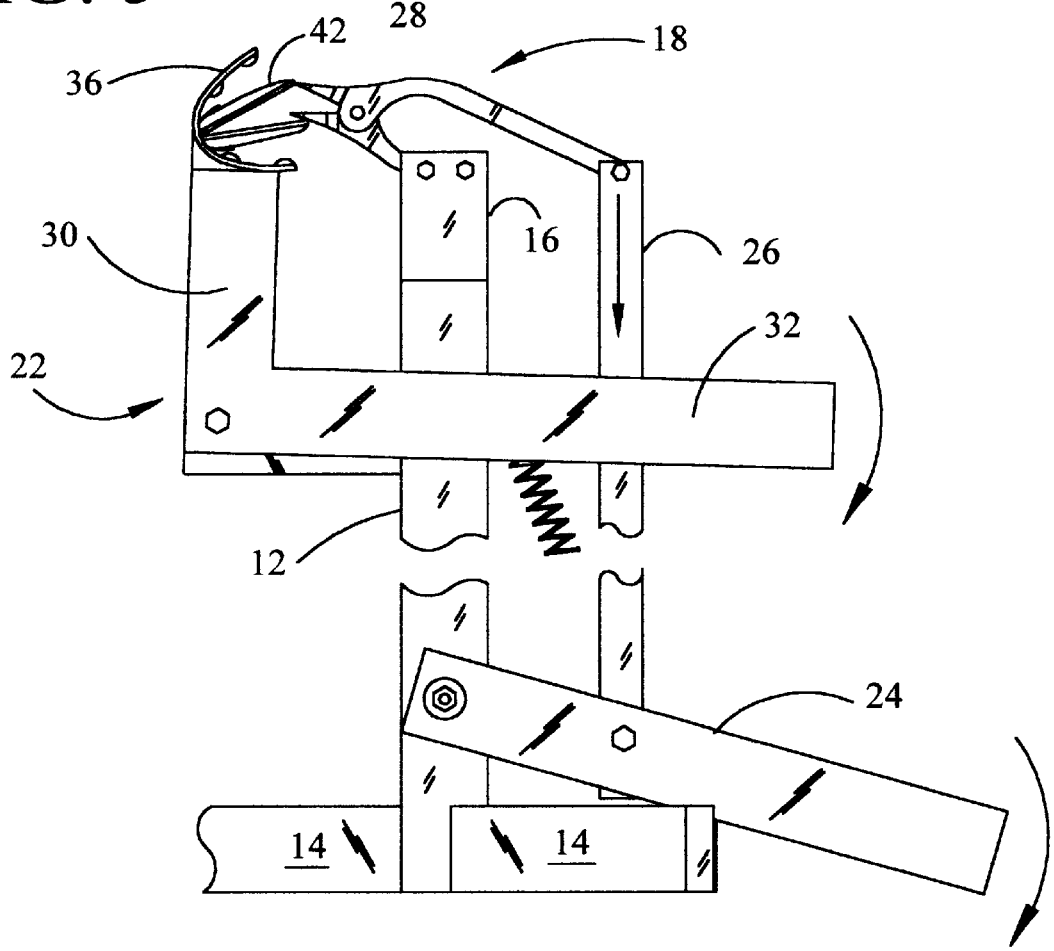
FIG. 6 is a side elevation view of the $1^{st}$ embodiment in operation showing 3rd position movements.

Turning now to FIG. 4, we see that, in operation, an oyster 42 is placed in the anvil 36 with the arm 32 in the raised position. The ridges 37 help retain the oyster in a more horizontal plane and prevent slippage when pressure is applied. The anvil 36 and the oyster 42 are then pivoted into position with the spreader 18 by rotation of the arm 32 downwards. As seen in FIG. 5, the oyster 42 is placed in contact with the spreader's opposable jaws 38 at the natural seam of the oyster shell. Jaw insertion is accomplished with only minimal manual force applied to the pivotal arm 32. Once the jaws 38 are inserted between the oyster's shell, foot pressure is applied to the pivotal pedal 24, as seen in FIG. 6, while maintaining constant pressure on the pivot arm 32, thereby spreading opposable jaws 38 by way of link 26 connected to spreader handle 40, thus forcing the shell of the oyster 42 apart with minimal effort. The oyster may be removed at this point prior to releasing the biased spreader or by simply releasing the foot pedal 24 and the raising of the lever arm 32 and removing the oyster shell manually from the anvil 36.

Figure 7:
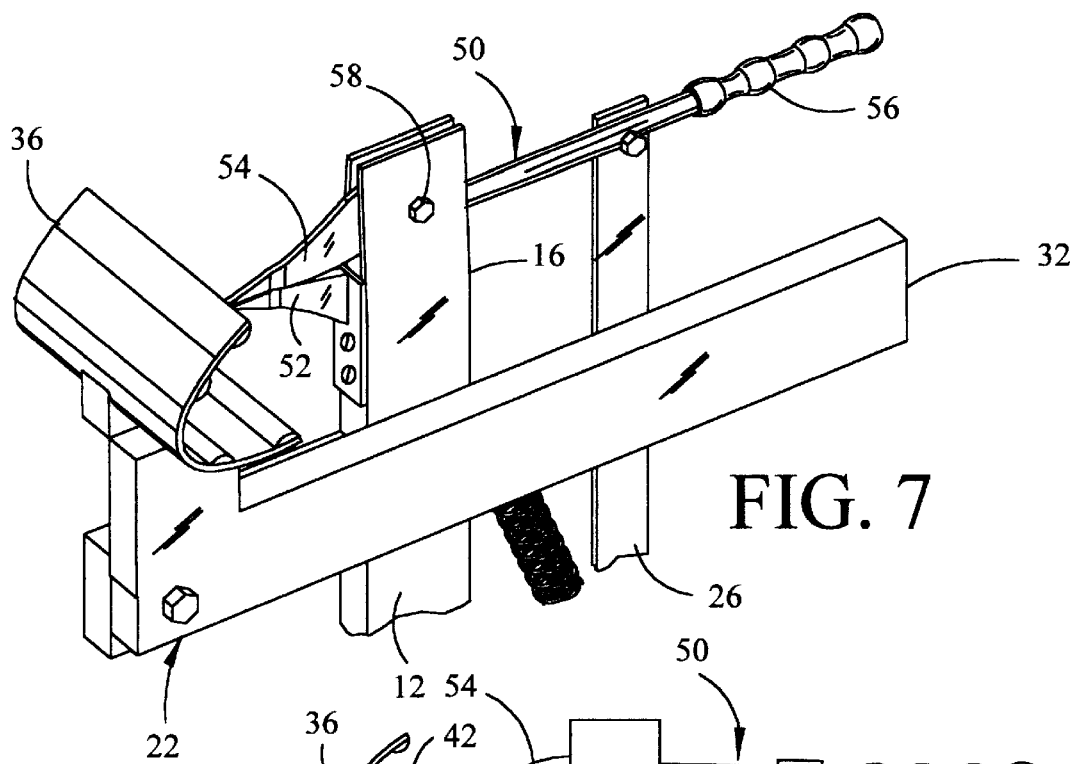
FIG. 7 is a partial isometric view of a $2^{nd}$ embodiment.

It is further anticipated that a more advantageous configuration of the spreader assembly 18 may be utilized as illustrated in FIG. 7. The spreader configuration in this embodiment includes a fixed lower jaw member 52 attached to the vertical column 12 and a handle 50 comprising an upper jaw portion 54 and a handle portion, with the handle 50 being pivotal about a pin 58. The foot pedal link 26 is also pivotally connected to the handle 50. In this arrangement, the handle 50 may be manually pivoted, thus spreading the jaw 54 apart from jaw 52 by hand or by foot operation via link 26.

Figure 8:
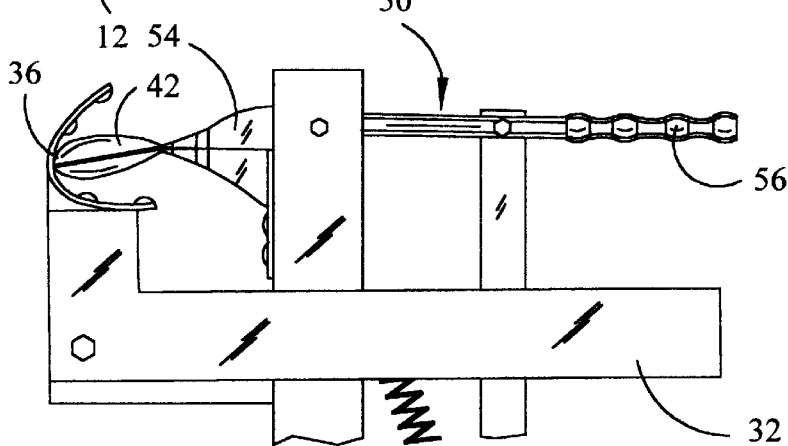
FIG. 8 is a partial side elevation view of the embodiment illustrated in FIG. 7 with oyster in the first contact position.
Figure 9:
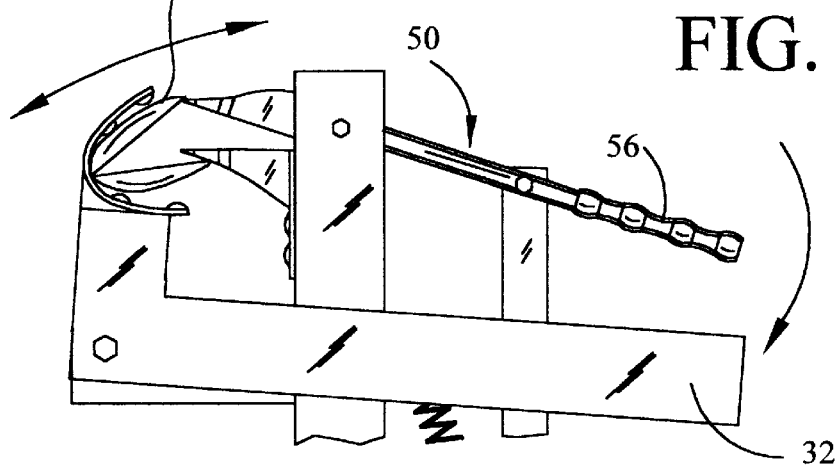
FIG. 9 is a partial side elevation view of the embodiment illustrated in FIG. 7 illustrating handle movements in the final open position.

As seen in FIG. 8, the oyster's shell seam is brought into contact with the thin, contoured jaws 52,54 by downward rotation of the pivoting anvil arm 32. Downward pressure is then applied to the anvil arm portion 32, thereby forcing the nibs or jaws 52,54 between the shell halves, thus spreading the two halves of the oyster shell apart. Downward pressure is then applied on the spreader handle 50, thus spreading the oyster shell 42 with minimum effort and with less damage to the oyster than would be the case of simply forcing the wedge shaped jaws between the shells, which inevitably damages the oyster and or cracks the shell, thereby losing the vital fluids surrounding the oyster. The fluids are considered essential to eating oysters on the half shell and the serving of such is unattractive if the shell is damaged or contains pieces of broken shell.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An apparatus for opening oyster shells along the natural seam formed between the hinged portions of the shell of said oyster, the apparatus comprising:
    a) a vertical column having a stabilizing means attached at a lower end of the column;
    b) a spreader means having first and second opposed jaw elements, one said jaw element being fixed to said vertical column and one jaw element being pivotal and having a handle portion, the elements being attached in a manner whereby the jaw of the first element is spread apart from the jaw of the second element upon pivoting of the handle portion, at least a portion of said spreader being removably attached perpendicular to the vertical column;
    c) a support member located adjacent the bracket extending outwardly from the column;
    d) an "L" shaped member having long and short leg portions and an elongated cupped member attached transversely to one end, the "L" shaped member being pivotally attached to said support member; and
    e) a foot pedal pivotally attached to the column adjacent the stabilizing means and connected to the spreader means by a connection link.

2. The apparatus for opening oyster shells according to claim 1 wherein the first and second jaw elements are pivotally attached one to the other.

3. The apparatus for opening oyster shells according to claim 1 wherein the spreader means is biased in a manner whereby the jaw portion of the first and second elements are normally closed.

4. The apparatus for opening oyster shells according to claim 1 wherein the cupped member, having internal ridges, is rotated geometrically to form a semicircular opening relative to the spreader means.

5. The apparatus for opening oyster shells according to claim 1 wherein the cupped member is attached to the shorter portion of "L" shaped member.

6. The apparatus for opening oyster shells according to claim 1 wherein the longer portion of the "L" shaped member is a lever handle.

7. An apparatus for opening oyster shells along the natural seam formed between the hinged portions of the shell of said oyster, the apparatus comprising:
    a) a vertical column having a stabilizing means attached at a lower end of the column and a connecting bracket attached to the upper end of the column;
    b) a spreader means having first and second opposed jaw and handle elements, the elements being pivotally attached and biased in the normally closed position in a manner whereby the jaw of the first element is spread apart from the jaw of the second element upon closing of the handle portion of at least one of the elements, the spreader having a handle portion of one of the elements removably attached to the connecting bracket;
    c) a support member extending perpendicular from the column located adjacent the bracket;
    d) an "L" shaped member having long and short leg portions and an elongated cupped member having ridges therein attached transversely to the end of the short leg portion, the "L" shaped member pivotally attached to the support member at the juncture of the long and short leg portions; and e) a foot pedal pivotally attached to the vertical column adjacent the stabilizing means and connected to the spreader means by a connection link.

8. The apparatus for opening oyster shells according to claim 7 wherein the connecting link is attached to the handle portion of the spreader means.

9. The apparatus for opening oyster shells according to claim 7 wherein the stabilizing means is a weighted base member.

10. A method for opening oyster shells along the natural seam formed between the hinged portions of the shell of said oyster, the methods comprising:

a) providing an apparatus comprising:
   i) a vertical column having a stabilizing means attached at a lower end of the column and a bracket attached to the upper end of the column;
   ii) a spreader means having first and second opposed jaw and handle elements, the elements pivotally attached in a manner whereby the jaw of the first element is spread apart from the jaw of the second element upon closing of the handle portions of the elements, the spreader having a handle portion of one of the elements removably attached to the bracket;
   iii) a support member extending outwardly from the column located adjacent the bracket;
   iv) an "L" shaped member having long and short leg portions and an elongated cupped member attached transversely to one end of the member pivotally attached to the support member; and
   v) a foot pedal pivotally attached to the column adjacent the stabilizing means connected to the spreader means by a connection link;

b) placing an oyster to be opened within the cupped member and aligning the shell along the natural seam formed between the hinged portions of the shell of said oyster and in contact with the tips of the spreader means by pivotally rotating the "L" shaped member downwards;

c) applying downward pressure on the long leg portion of the "L" shaped member while applying pressure to the foot pedal, thereby spreading the jaw portions of the spreader means to an extent whereby the oyster shell is separated; and d) removing the oyster and a portion of its shell from the apparatus while maintaining the oyster and its vital fluids.

* * * * *